United States Patent
Diamond et al.

(10) Patent No.: US 11,832,713 B2
(45) Date of Patent: Dec. 5, 2023

(54) ELECTRIC UTILITY BRUSH WITH A DYNAMIC BRUSH HEAD

(71) Applicant: GlaxoSmithKline Consumer Healthcare (UK) IP Limited, Middlesex (GB)

(72) Inventors: David Diamond, Middlesex (GB); Jean Diamond, Middlesex (GB)

(73) Assignee: GLAXOSMITHKLINE CONSUMER HEALTHCARE (UK) IP LIMITED, Middlesex (GB)

( * ) Notice: Subject to any disclaimer, the term of this patent is extended or adjusted under 35 U.S.C. 154(b) by 24 days.

(21) Appl. No.: 16/481,107

(22) PCT Filed: Jan. 25, 2018

(86) PCT No.: PCT/EP2018/051764
§ 371 (c)(1),
(2) Date: Jul. 26, 2019

(87) PCT Pub. No.: WO2018/138173
PCT Pub. Date: Aug. 2, 2018

(65) Prior Publication Data
US 2021/0127824 A1    May 6, 2021

(30) Foreign Application Priority Data

Jan. 27, 2017 (IE) .................... 2017/0028

(51) Int. Cl.
*A46B 13/02* (2006.01)
*A61C 17/34* (2006.01)
*A61C 17/26* (2006.01)
*A46B 9/02* (2006.01)
*A46B 9/08* (2006.01)
*A61C 17/22* (2006.01)

(52) U.S. Cl.
CPC .............. *A46B 13/02* (2013.01); *A46B 9/026* (2013.01); *A46B 9/08* (2013.01); *A61C 17/349* (2013.01); *A61C 17/3418* (2013.01); *A61C 17/3427* (2013.01); *A61C 17/3472* (2013.01); *A61C 17/222* (2013.01); *A61C 17/26* (2013.01)

(58) Field of Classification Search
CPC .............. A61C 17/3472; A61C 17/349; A61C 17/3418; A61C 17/3427
See application file for complete search history.

(56) References Cited

U.S. PATENT DOCUMENTS

| | | | | |
|---|---|---|---|---|
| 1,927,566 A | * | 9/1933 | Hawk | A61C 17/26 15/23 |
| 6,032,313 A | | 3/2000 | Tsang | |
| 2010/0132140 A1 | * | 6/2010 | Diamond | A61C 17/3472 15/22.1 |
| 2013/0055515 A1 | * | 3/2013 | Diamond | A46B 9/04 15/28 |
| 2014/0173839 A1 | * | 6/2014 | Henderson | A61C 17/3418 15/22.1 |

FOREIGN PATENT DOCUMENTS

| | | |
|---|---|---|
| WO | WO 2008/125269 A2 | 10/2008 |
| WO | WO 2011/141577 A1 | 11/2011 |

* cited by examiner

*Primary Examiner* — Randall E Chin

(57) ABSTRACT

An electric utility brush with a dynamic brush head which has a rotatable head which is capable of undergoing rotation about two separate axes in order to effect multiple modes of brushing.

9 Claims, 1 Drawing Sheet

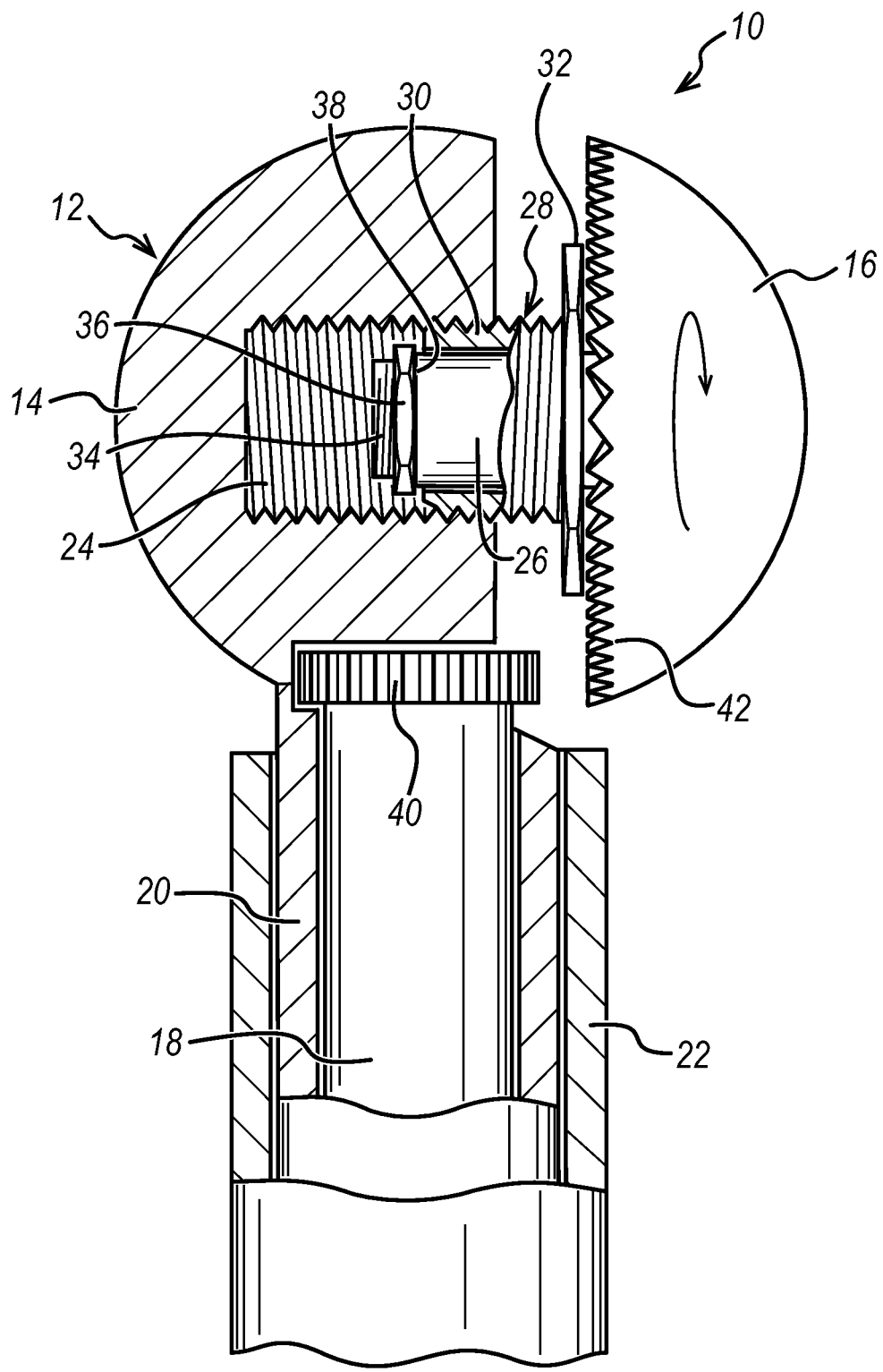

ELECTRIC UTILITY BRUSH WITH A DYNAMIC BRUSH HEAD

This application is a 371 of International Application No. PCT/EP2018/051764, filed Jan. 25, 2018, which claims the priority of IE Application No. S2017/0028, filed Jan. 27, 2017 which is incorporated herein in its entirety.

FIELD OF THE INVENTION

The present invention is concerned with an electric utility brush with a dynamic brush head, and in particular a handheld electric utility brush such as an electric toothbrush or the like, which has a rotatable head which is capable of undergoing rotation about two separate axes in order to effect multiple modes of brushing.

BACKGROUND OF THE INVENTION

Electric brushes for various applications, for example electric toothbrushes, polishing brushes, cleaning brushes, etc. are well known and take many forms, generally incorporating a head with an array of bristles, and drive means, usually in the form of an electric motor or the like, which are adapted to impart at least one driving motion to the head.

For an electric toothbrush one of the most common driving motions is rotational. In some cases a number of driving modes may be available, for example allowing the brush head to be rotationally driven about one axis as one driving mode, and alternatively about a second axis as a second driving mode. This may be beneficial for certain applications, for example in the case of an electric toothbrush allowing the axis of rotation of the brush head to be located in two or more different orientations to provide the most efficient brushing action for the particular group of teeth being brushed.

It may however be desirable, when brushing teeth in certain areas of the mouth, for example adjacent the cheek, to avoid such rotational motion of the brush head as a portion of the brush head will be pressed against the soft tissue of the cheek and the bristles of the rotating head will thus rub against the cheek and may cause discomfort or irritation.

Due to the small size of hand held toothbrushes, in particular the brush head itself, significant design and manufacturing limitations are encountered when attempting to produce the various drive components to enable the above described dual axis rotation, which requires said complex drive components to be located on the interior of the head and thus in extremely limited space. In addition, the brush head requires an array of bristles projecting from the outer surface, and said bristles must be sufficiently mechanically secured to the head to be robust and provide the necessary working life expected of such a product. This is a further complication in terms of having available space within the head to anchor the bristles, and from a manufacturing perspective when working with such diminutive parts.

It is therefore an object of the present invention to address the above-mentioned issues.

SUMMARY OF THE INVENTION

An electric utility brush comprising an inner drive shaft and a concentric outer drive shaft; a rotatable head comprising a first part fixed to an end of the outer drive shaft, and a second part rotatably mounted to the first part in driving engagement with the inner drive shaft.

Preferably, the brush head is spherical, the first and second parts being substantially hemispherical.

Preferably, the first part is larger in size than the second part.

Preferably, the second part of the head comprises an axle projecting from an end face and the first part of the head comprises a complementary socket in which the axle is seated.

Preferably, the brush head comprises a bearing disposed between the axle and the socket.

Preferably, the bearing comprises a bushing retained in the socket.

Preferably, the bushing comprising a sleeve within which the axle is located and a flange extending radially outward from an end of the sleeve and located between the first and second parts of the head.

Preferably, the flange defines at least a pair of parallel sides.

Preferably, the utility brush comprises a set of meshing gears provided between the inner drive shaft and the second part of the head.

Preferably, the set of meshing gears comprise driving gear teeth formed integrally with an end of the inner drive shaft and complementary driven gear teeth formed integrally with an end face of the second part of the head.

Preferably, the brush head comprises an array of bristles projecting from an outer surface.

Preferably, the utility brush comprises a sleeve at least partially surrounding the outer drive shaft.

Preferably, the utility brush comprises an indexing mechanism operable to locate the outer drive shaft at a set angular orientation when the inner drive shaft is being driven independently of the outer drive shaft.

BRIEF DESCRIPTION OF THE DRAWINGS

The present invention will now be described with reference to the accompanying drawing, in which:

FIG. 1 illustrate a sectioned side elevation of an electric utility brush in the form of an electric toothbrush according to a preferred embodiment of the present invention.

DETAILED DESCRIPTION OF THE DRAWINGS

Referring now to the accompanying drawing, there is illustrated an electric utility brush, generally indicated as 10, which has particular application in small hand-held devices such as an electric toothbrush (not shown) or the like.

The utility brush 10 comprises a brush head 12 which in the embodiment illustrated is substantially spherical in form, and comprising a first part 14 which is substantially hemispherical and a second part 16 which is also substantially hemispherical and is rotatably mounted to the first part 14. While both the first part 14 and the second part 16 are substantially hemispherical in shape, in the preferred embodiment illustrated the first part 14 is larger than the second part 16, which provides a number of design and manufacturing advantages as described in detail hereinafter.

The utility brush 10 further comprises a solid inner drive shaft 18 and a concentrically located hollow outer drive shaft 20 which surrounds the inner drive shaft 18, both drive shafts 18, 20 being in operative engagement with the brush head 12 in order to effect the rotation thereof, again as will be described in detail hereinafter. The utility brush 10 may additionally comprise an outer protective sleeve 22 surrounding the outer drive shaft 20, and which remains fixed during use while the inner and outer drive shafts 18, 20 may be rotated therein. In use, the inner and outer drive shafts 18, 20, along with the sleeve 22 will form a neck or stem of an electric toothbrush, a body or handle (not shown) being provided at an end thereof opposed to the head 12 in order to allow the user to manually grasp the utility brush 10, the body or handle (not shown) also providing a location at which an electric motor, battery, and control circuitry may be housed. No further explanation of these components is provided hereinafter, and it will be appreciated that any other suitable functional equivalents may be provided in place thereof.

The first part 14 of the brush head 12 includes a cylindrical socket 24 formed therein, while the second part 16 of the brush head 12 comprises a short axle 26 projecting outwardly therefrom and which, with the first and second parts 14,16 secured to one another, is located within the socket 24. It will be appreciated that the second part 16 is shown slightly separated from the first part 14 in FIG. 1 to allow a clearer understanding of the configuration and operation of the utility brush 10.

The brush head 12 additionally comprises a bearing in the form of a bushing 28 provided between the socket 24 and the axle 26, the bushing having a cylindrical sleeve 30 in which the axle 26 is retained for rotation and a radially extending flange 32 which in use is positioned between the opposed faces of the first and second parts 14, 16 of the brush head 12. In the preferred embodiment illustrated, the cylindrical wall of the socket 24 is threaded and the outer surface of the sleeve 30 is provided with a corresponding thread in order to allow the second part 16, with the bushing 28 located about the axle 26, to be threaded into the first part 14 in order to secure the first and second parts 14, 16 together as the spherical brush head 12. The flange 32 is therefore preferably of hexagonal shape such as to effectively define a nut or bolt head which can be engaged by a thin spanner to turn the bushing 28 in order to thread the bushing 28 into the threaded socket. It will therefore be understood that the flange 32 must have at least a pair of parallel sides or edges, and is most preferably hexagonal in shape.

The axle 26 is provided with a threaded end 34 onto which a nut 36 is threaded once the axle 26 has been inserted into the bushing 28 and before the bushing 28 is threaded into the socket 24. The nut 36 is tightened against a shoulder 38 formed on the axle 26 a small distance outboard of the end of the sleeve 30, the nut 36 overlapping the end of the sleeve 30 in order to prevent the axle 26 from being withdrawn from the sleeve 30 while still allowing the second part 16 to rotate freely within the bushing 28. In this way, the second part 16 can be rotated in the bushing 28 and relative to the first part 14 about a longitudinal axis of the axle 26.

Turning then to the connection between the brush head 12 and the drive shafts 18, 20, the first part 14 of the brush head 12 is fixed to or formed integrally with an end of the outer drive shaft 20 thereby allowing the entire brush head 12 to be rotated about a longitudinal axis of the drive shafts 18, 20 by rotating the two drive shafts 18, 20 in unison. This will ensure that the second part 16 remains fixed relative to the first part 14 as the entire brush head 12 undergoes rotation on this axis.

The utility brush 10 also comprises a gear set in the form of driving gears 40 provided on or formed integrally with an end of the inner drive shaft 18, and a complimentary set of driven gears provided on or formed integrally with the second part 16 of the brush head 12. The driving gears 40 and driven gears 42 mesh with one another when the second part 16 is secured to the first part 14 of the brush head 12, allowing drive to be transferred through 90 degrees from the inner drive shaft 18 to the second part 16, in order to effect rotation of the second part 16 relative to the first part 14 when the inner drive shaft 18 is driven independently of the outer drive shaft 20.

Thus in use the utility brush 10 is capable of imparting first and second independent brushing motions to the brush head 12, a first brushing motion in which the entire brush head 12 is rotated about a longitudinal axis of the drive shafts 18, 20 through synchronous rotation of the drive shafts 18, 20, and a second independent brushing motion in which the outer drive shaft 20 is immobilised and only the inner drive shaft 18 is rotated therein, thereby effecting rotation of the second part 16 of the brush head 12 about a longitudinal axis of the axle 26, which is therefore perpendicular to the first brushing motion. This motion is particularly suited to the electric toothbrush application of the utility brush 10, as if the stationary first part of the brush head 12 may be placed against the inside of the cheek while the rotating second part 16 effects cleaning of the surface of the teeth facing the cheek, thus avoiding any irritation of the soft tissue of the cheek which might otherwise occur if the entire brush head 12 were rotated as this would result in abrasion of the cheek which would be particularly pronounced where the outer surface of the brush head 12 is covered in an array of bristles as is conventionally the case with a toothbrush head.

By fixing the first part 14 of the head 12 to the outer drive shaft 20 it is possible to increase the size of the first part 14 relative to the second part 16, such that the first part 14 is greater in size than a hemisphere and the second part is thus correspondingly reduced in size to be less than a hemisphere. This increase in the size of the first part 14 provided increased space on the interior of the head 12 to both accommodate the drive components and to secure tufts of bristles to the head 12.

The utility brush 10 may therefore be provided with suitable controls (not shown) which allow the first or second brushing motion to be selected by the user, or to be selected automatically depending on the orientation of the utility brush 10. The utility brush 10 may additionally or alternatively comprise an indexing mechanism (not shown) which may be operable to locate the outer drive shaft 20 at a set angular orientation when the inner drive shaft 18 is to be driven independently of the outer drive shaft 20 in order to effect independent rotation of the second part 16 of the brush head 12.

The invention claimed is:

1. An electric utility brush comprising an inner drive shaft and a concentric outer drive shaft; a rotatable head comprising a first part fixed to an end of the outer drive shaft, a second part rotatably mounted to the first part in driving engagement with the inner drive shaft, and a set of meshing gears provided between the inner drive shaft and the second part of the head, wherein the meshing gears comprise driving gear teeth and complementary driven gear teeth, wherein the rotatable head is spherical, the first and second parts being substantially hemispherical and wherein the driving gear teeth is formed integrally with an end of the inner drive shaft and the complementary driven gear teeth is formed integrally with an end face of the second part of the head.

2. The electric utility brush of claim 1 in which the first part is larger in size than the second part.

3. The electric utility brush of claim 1 in which the second part of the head comprises an axle projecting from an end face and the first part of the head comprises a complimentary socket in which the axle is seated.

4. The electric utility brush of claim 3 in which the head comprises a bearing disposed between the axle and the socket.

5. The electric utility brush of claim 4 in which the bearing comprises a bushing retained in the socket.

6. The electric utility brush of claim 5 in which the bushing comprising a sleeve within which the axle is located and a flange extending radially outward from an end of the sleeve and located between the first and second parts of the head.

7. The electric utility brush of claim 6 in which the flange defines at least a pair of parallel sides.

8. The electric utility brush of claim 1 in which the rotatable head comprises an array of bristles projecting from an outer surface.

9. The electric utility brush of claim 1 in which the utility brush comprises a sleeve at least partially surrounding the outer drive shaft.

\* \* \* \* \*